(12) United States Patent
Chamley et al.

(10) Patent No.: US 9,129,137 B2
(45) Date of Patent: Sep. 8, 2015

(54) METHOD, COMPUTER PROGRAM AND DEVICE FOR PROVIDING SECURITY FOR INTERMEDIATE PROGRAMMING CODE FOR ITS EXECUTION BY A VIRTUAL MACHINE

(75) Inventors: Olivier Chamley, Leognan (FR); Hugo Greneche, Cestas (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 607 days.

(21) Appl. No.: 13/292,228

(22) Filed: Nov. 9, 2011

(65) Prior Publication Data
US 2012/0117550 A1    May 10, 2012

(30) Foreign Application Priority Data

Nov. 10, 2010  (FR) ..................................... 10 59276

(51) Int. Cl.
G06F 9/45       (2006.01)
G06F 21/75    (2013.01)
G06F 21/77    (2013.01)

(52) U.S. Cl.
CPC .............. G06F 21/75 (2013.01); G06F 8/443 (2013.01); G06F 21/77 (2013.01)

(58) Field of Classification Search
USPC ........................................................ 717/148
See application file for complete search history.

(56) References Cited

U.S. PATENT DOCUMENTS

| 6,058,482 | A  | * | 5/2000 | Liu ................................ 726/23 |
| 2007/0250703 | A1 | * | 10/2007 | Giraud et al. ................. 713/154 |
| 2009/0165149 | A1 |   | 6/2009 | Gonzalvo |
| 2010/0011243 | A1 | * | 1/2010 | Locasto et al. .................. 714/15 |
| 2010/0138819 | A1 | * | 6/2010 | Burka et al. .................... 717/154 |
| 2012/0246487 | A1 | * | 9/2012 | Gu et al. ....................... 713/190 |

FOREIGN PATENT DOCUMENTS

WO    WO 2005/008451      1/2005

OTHER PUBLICATIONS

French Search Report dated Aug. 10, 2011, corresponding to Foreign Priority Application No. FR 1059276.
Ahmadou Al Khary SERE et al.; "Automatic Detection of Fault Attack and Countermeasures"; Proceedings of the 4th Workshop on Embedded Systems Security, Wess 09, Jan. 1, 2009; pp. 1-6.

* cited by examiner

*Primary Examiner* — John Chavis
(74) *Attorney, Agent, or Firm* — Young & Thompson (57) ABSTRACT

The invention in particular relates to provide security for intermediate programming code for its execution by a virtual machine. After having received (200) a plurality of pseudo-instructions of the intermediate programming code, the plurality of bytecode instructions is converted (230, 235), the conversion including a step of inserting at least one bytecode instruction relative to a function for execution checking of at least one bytecode instruction of the plurality of bytecode instructions. A following step is directed to generating bytecode, the generated bytecode including the plurality of converted bytecode instructions.

13 Claims, 3 Drawing Sheets

METHOD, COMPUTER PROGRAM AND DEVICE FOR PROVIDING SECURITY FOR INTERMEDIATE PROGRAMMING CODE FOR ITS EXECUTION BY A VIRTUAL MACHINE

The present invention concerns the execution of software applications coded in intermediate programming language and more particularly a method, a computer program and a device for providing security for intermediate programming code for its execution in a virtual machine.

BACKGROUND OF THE INVENTION

Due to the different hardware configurations which may be used to execute software applications, a particular programming language, termed intermediate programming language, is frequently used. It enables developers to write applications using high-level programming languages, independently of the hardware architectures on which those applications must be executed. The files generated by the developers, in conformity with those high-level languages, are compiled (independently of specific hardware platforms) to produce application files based on the intermediate programming language. A particular software layer, known by the name virtual machine, specific to a particular hardware platform, then enables the execution of applications based on application files using the intermediate programming language.

By way of illustration, an application written in the Java programming language (Java is a trademark) may be compiled into Java bytecode (sometimes also referred to as pseudo-code), that is to say in an intermediate programming language that can be executed by a Java virtual machine on platforms having different hardware characteristics. Java virtual machines are specific to each hardware platform whereas the code of the application, in intermediate programming language, is common to those different platforms.

While the virtual machines must be in conformity with given specifications to enable the execution of applications coded in intermediate programming language, several types of virtual machines nevertheless exist that are adapted to the type of hardware platforms on which the applications are executed. Typically, these virtual machines are distinguished from each other by their instruction sets of differing extent.

Thus, for example, there are particular Java virtual machines, known under the name of Java Card, for hardware platforms such as microcircuit cards.

Figure 1:
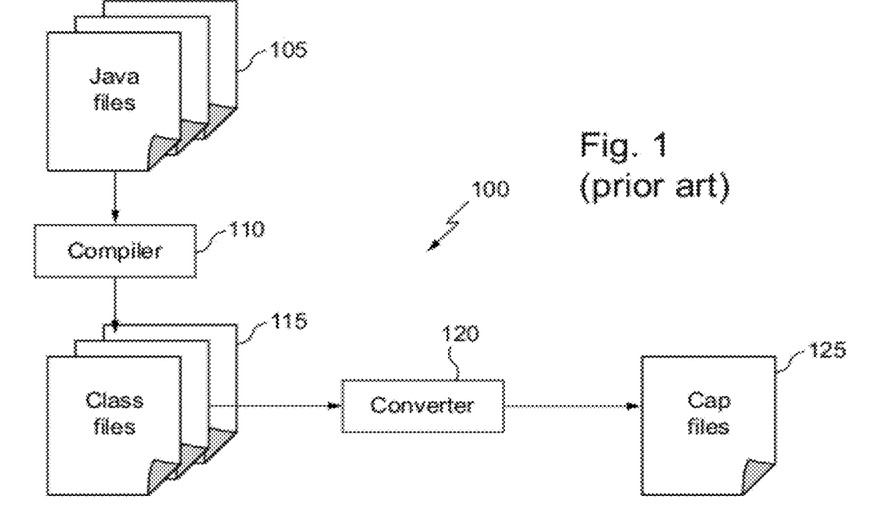
FIG. 1 is a diagrammatic illustration of steps of a method for generating files that can be executed by a virtual machine for microcircuit cards.

FIG. 1 is a diagrammatic illustration of steps of a method 100 for generating files that can be executed by a virtual machine for microcircuit cards. The application concerned here is a Java type application.

As illustrated, the source files 105 written in Java language, that is to say a high-level language, are compiled in a compiler 110 to produce files 115 in intermediate programming language, known under the name of Class type files. These files are in conformity with a virtual machine standard. The files 115 are then converted in a converter 120 to put them in conformity with a particular virtual machine, here Java Card. The converted files, referenced 125, are of Cap type here. The conversion made by the converter 120 is intended to simplify the instructions of the intermediate programming language in order for the files 115 to be able to be executed by a simplified virtual machine. Such a conversion is in particular directed to deleting certain types of variables, in particular Boolean type variables.

In other words, files of instructions in source code in Java format are compiled here using a Java compiler into bytecode instruction files in class format. These Class files are executable by numerous Java virtual machines but not by the Java Card virtual machine which does not contain the entire Java instruction set. These Class files are therefore converted using a Java Card converter in order to obtain a file in Cap format which is executable by a Java Card virtual machine.

To execute an application written in intermediate programming language, whether or not converted, a virtual machine has available an instruction set particular to itself and an execution stack. However, although the execution of an application by a virtual machine has a certain level of security, the Java applications executed by virtual machines, in particular by Java Card, are liable to attacks, in particular fault injection attacks. This type of attack consists in injecting a fault at the time of the execution of the application to change a value on which a computation is made or to force the execution of certain routines or branches of the application.

To counter this type of attack, the code of certain applications is redundant in order to perform checks during its execution. Although such a solution enables the security of execution of the applications to be improved, it requires substantial resources. To mitigate this drawback, patent application US 2009/0165149 proposes a method of executing an application compiled in intermediate programming code on a portable digital apparatus equipped with a virtual execution machine for the interpretation of the intermediate code, comprising a step of applying a secure execution mode in which the interpretation of the intermediate code by the virtual machine comprises the following steps:

for each item of data of the code manipulated for the execution of an arithmetical and/or logical operation defined by the code, generating an item of check data linked to said item of data of the code by the intermediary of a predetermined function; and, in parallel with the execution of said operation, execute a checking operation linked to said operation defined by the intermediate code of said predetermined function and acting on the item or items of check data. However, such a solution requires substantial modification to the virtual machine used.

The invention enables at least one of the problems set forth above to be solved.

SUMMARY OF THE INVENTION

The invention thus relates to a computer method for providing security for intermediate programming code for its execution by a virtual machine, the method comprising the following steps, receiving a plurality of bytecode instructions of said intermediate programming code;

converting said plurality of bytecode instructions, said conversion comprising a step of inserting at least one bytecode instruction relative to a function for execution checking of at least one bytecode instruction of said plurality of bytecode instructions; and, generating bytecode, the generated bytecode comprising said plurality of converted bytecode instructions.

The method according to the invention thus provides security for the execution of bytecode without it being necessary to modify the corresponding source code. Furthermore, the method may be implemented in a step of converting intermediate programming code such that its implementation is transparent for a user.

According to a particular embodiment, said inserting step comprises a step of inserting a bytecode instruction representing a command for said virtual machine, for example in the form of a Java custom component. The generated bytecode may thus be executed securely by an adapted virtual machine while at the same time being executable in a standard virtual machine. Said command for said virtual machine is for example directed to the verification of an execution stack of said virtual machine in order to check that said execution stack of said virtual machine is empty. By checking the state of the execution stack, it is possible to check that one or more functions have indeed been executed.

Still according to a particular embodiment, said converting step comprises, for each of said received bytecode instructions, the following steps, if said bytecode instruction is directed to predetermined processing of at least one first predetermined value, deleting said bytecode instruction and inserting a bytecode instruction concerning said predetermined processing for at least one second predetermined value, distinct from said at least one first predetermined value; and, if said bytecode instruction is directed to the comparison of said at least one first value with another value, deleting said bytecode instruction and inserting a bytecode instruction directed to comparing said at least one second value with said other value.

The method according to the invention thus enables predetermined values to be modified, in particular Boolean values that can be easily identified, by certain values that are more difficult to apprehend.

Still according to a particular embodiment, said bytecode instruction directed to predetermined processing of at least one first predetermined value is directed to the initialization or attribution of a local variable whose value is, after execution of the initializing or attributing step, equal to said first value.

The method further comprises, preferably, a step of defining or computing said at least one second value.

Advantageously, the method further comprises a step of analyzing at least one set of said plurality of bytecode instructions, said steps of deleting said bytecode instruction, directed to predetermined processing of at least one first predetermined value, and of inserting said bytecode instruction directed to said predetermined processing for at least one second predetermined value, being attributed in response to said analyzing step. It is thus possible to identify types of variables and to modify processing instructions for those variables only depending on their type. In particular, it is possible to modify only functions processing Boolean type variables.

According to a particular embodiment, the method further comprises a prior step of code compiling, the result of said compiling step comprising said plurality of bytecode instructions.

The invention is also directed to a computer program comprising instructions adapted to the implementation of each of the steps of the method described earlier when said program is executed on a computer, a device comprising means adapted to the implementation of each of the steps of the method described earlier, as well as a microcircuit card comprising bytecode instructions obtained by the method described above.

The advantages procured by this computer program, this device and this microcircuit card are similar to those referred to above.

BRIEF DESCRIPTION OF THE DRAWINGS

Other advantages, objects and features of the present invention will emerge from the following detailed description, given by way of non-limiting example, relative to the accompanying drawings in which.

DETAILED DESCRIPTION OF THE PREFERRED EMBODIMENTS

The invention generally concerns modifying at least a part of the code of an application written in intermediate programming language at the time of a conversion for inserting at least one bytecode instruction enabling the security of execution of that application to be improved.

Such an insertion may be carried out during the conversion itself or during a step preceding or following that conversion. Thus, in accordance with the invention, at least one bytecode instruction enabling the security of execution of an application to be improved may be inserted in a file of intermediate code of the application (using an intermediate programming language), for example a file of Class type. Alternatively or in complementary manner, at least one bytecode instruction enabling the security of execution of an application to be improved may be inserted in a converted intermediate code file of the application, for example a file of Cap type.

It is first of all to be observed that the Boolean type which may be attributed to data or variables is, in a Java source file, particular since the information on that type is "lost" during the compilation phase. To be precise, an item of information of Boolean type is, in a Java file, equal to true or false. However, after the compilation phase, these values are replaced by the integer values zero or one.

Thus, for example, the source Java expression "boolean myBoolean=false" is replaced, during its compilation, by the expression "iconst_0" whereby the value zero is placed on the execution stack of the virtual machine and the following expression "istore_1" for storing the last value of the execution stack of the virtual machine in a first local variable. A local variable corresponds here to a field of the register of a non-volatile memory. Similarly, the source Java expression "boolean myResult=true" is replaced, during its compilation, by the expression "iconst_1" whereby the value one is placed on the execution stack of the virtual machine and the following expression "istore_2" for storing the last value of the execution stack of the virtual machine in another local variable. Thus, the Boolean character of the variables myBoolean and myResult has disappeared to be replaced by the integer values zero and one.

The Boolean type in a Java source file is typically used to perform conditional tests which are generally carried out using the if function. During the compilation phase, these functions are replaced by specific bytecodes (sometimes referred to as pseudo-instructions), which compare the value present on the execution stack with the value zero. Thus, for example, the bytecode instruction ifeq compares the element present on the execution stack with the value zero and performs a jump to the code resulting from the comparison.

Table 1 given as an appendix illustrates a simplified example of compilation of a function whose source code is written opinion Java language. The first column presents Java instructions of the function as they may be written in a Java source file whereas the second column presents the corresponding bytecode instructions, that is to say the content of a corresponding file of Class type, the third column representing an index to the bytecode instructions.

As illustrated, a first Java instruction is intended to initialize the variable myBoolean to the value false. The result of the compilation of that instruction comprises the bytecode instructions "iconst_0" and "istore_1" to store the value zero, after it has been placed on the execution stack, in a first local variable. This first instruction is followed by a second to initialize the variable myResult to the value true. Again, the result of the compilation of that instruction comprises the bytecode instructions "iconst_1" and "istore_2" to store the value one, after it has been placed on the execution stack, in a second local variable.

These Java declaration instructions are followed here by a Java test instruction consisting in testing the variable myBoolean. The result of the compilation of the latter leads to the bytecode instructions "iload_1" and "ifeq_9" which are intended to place the value of the first local variable on the execution stack and, if the value of the execution stack is equal to one, performing a jump to the bytecode instruction having the index 9, that is to say to the first bytecode instruction to execute if the result of the test is false.

The following Java instruction, if there is no jump, consists of assigning the value true to the variable myResult. The result of the compilation of that expression leads to the bytecode instructions "iconst_1" and "istore_2" to store the value one, after it has been placed on the execution stack, in the second local variable.

As there are no other instructions to execute when the result of the preceding test is true, a following step consists of a jump to the bytecode instruction having the index 11, that is to say to the first instruction following the bytecode instructions to execute when the result of the preceding test is false.

When the result of the preceding test is false, the following Java instruction, if there is no jump, consists of assigning the value false to the variable myResult. The result of the compilation of that expression leads to the bytecode instructions "iconst_0" and "istore_2" to store the value zero, after it has been placed on the execution stack, in the second local variable.

Thus, as illustrated in this example, the test for a variable of Boolean type with a value true is compiled into a test for the value of a variable with zero. The test of comparison with a value true or false has disappeared during the compilation of the Java instructions.

Consequently, the techniques of fault injection attacks, which enable the values on the execution stack of the Java virtual machine to be modified, may be used to modify the results of tests and thus lead to the execution of the whole of the Java code or to certain parts which should not have been executed.

It is noted here that if, in the preceding example, a test is carried out on a Boolean value, the risks of fault attacks are equivalent when tests concerning integers having the value zero and one are conducted.

To provide security for the execution of tests in a Java application executed by a virtual machine requiring conversion of the code into intermediate programming language (bytecode), the invention comprises, according to a first embodiment, steps of modifying the values used to perform tests in order for them not to be able to be found and thus modified easily. In other words, the invention here is directed to providing security for the variables of Boolean type by setting to values true and false, zero and one or any other values that are easily identifiable of a Java source file, particular internal values, in particular values different from zero and one.

This modification is advantageously carried out during a step of converting the bytecode instructions in order to enrich the instruction set of a virtual machine, for example an embedded Java Card virtual machine, the implementation of the invention not requiring modification of the Java source code. The virtual machines used to execute them are modified to give new functionalities as described below.

Table 2 given in the appendix hereto illustrates a simplified example of conversion of the compiled bytecode illustrated in table 1. The first column presents Java bytecode instructions as they may be in a Java Class type file whereas the second column presents the corresponding bytecode instructions after modification, the third column representing an index to the bytecode instructions.

In general terms, it is considered here that the conversion is intended to convert bytecode instructions relative to data of integer type into bytecode instructions relative to data of short code type. Thus, for example the bytecode instruction istore_1 which is intended to store the value placed on the execution stack in a first local variable in integer form is replaced by the bytecode instruction sstore_1 which is intended to store the value of the execution stack in a first local variable in short code form. Similarly, the bytecode instruction iload_1 which is intended to place the value stored in the first local variable in the form of an integer on the execution stack is replaced by the bytecode instruction sload_1 which is intended to place the value stored in the first local variable in the form of a short code on the execution stack.

However, other conversions may be used.

As illustrated in table 2, the bytecode instruction iconst_0 is deleted and the bytecode instruction sconst_false is inserted in its place. The bytecode instruction sconst_false is intended to place a first predetermined value on the execution stack. This value represents the state false, it is a number of short code type here. It may be constant and particular to the application or may be a random value that is determined, for example, on launching the application. Alternatively, this value may be a constant particular to a virtual machine or a random value determined, for example, at the time of the launching of the virtual machine. Similarly, the bytecode instruction iconst_1 is deleted and the bytecode instruction sconst_true is inserted in its place. The bytecode instruction sconst_true is intended to place a second predetermined value on the execution stack. This value represent the state true. Again, this is a number of short code type here which may be a constant particular to the application, a random value determined, for example at the time of the launching of the application or a value linked to the virtual machine.

Moreover, the bytecode instruction ifeq is deleted and the bytecode instruction ifBeq is inserted in its place. The object of the bytecode instruction ifBeq is to compare the value present on the execution stack with the second predetermined value representing the state true. In the example presented in table 2, if the value on the execution stack is not equal to the second predetermined value (predetermined value representing the state true), the test is not verified and the following bytecode instruction to be executed is the bytecode instruction having the index 9. In the opposite case, the bytecode instruction following the comparison bytecode instruction is executed.

Alternatively, the value placed on the execution stack may compared with both values of the Boolean states. Thus, the bytecode instruction ifBeq compares the value present on the execution stack with the second predetermined value representing the state true. If the test is verified, the following bytecode instruction to be executed is the bytecode instruction whose index follows that of the bytecode instruction ifBeq (here 6). If the test is not verified, the bytecode instruction ifBeq compares the value present on the execution stack with the first predetermined value representing the state false. If the test is verified, the following bytecode instruction to be executed is the bytecode instruction whose index is indicated (here 9). If the test is not verified, an exception routine is executed. This may in particular be a counter-measure consisting, for example, in making the microcontroller inoperative (for example in known manner, by writing a value in non-volatile memory, which is verified by the controller at the time of later executions).

The bytecode instructions sconst_false and sconst_true correspond to internal values different from zero and one. Thus, it is difficult to modify these values for executing comparisons correctly. In other words, it is difficult, for fault injection attacks, to modify the value of a variable on the stack since those values are no longer zero or one but internal values.

Table 3 presented in the appendix illustrates an example of a modification table to convert the bytecode in accordance with the example given with reference to table 2. The first column here represents bytecode instructions resulting from a compilation step whereas the second column comprises the corresponding bytecode instructions after modification.

Figure 2:
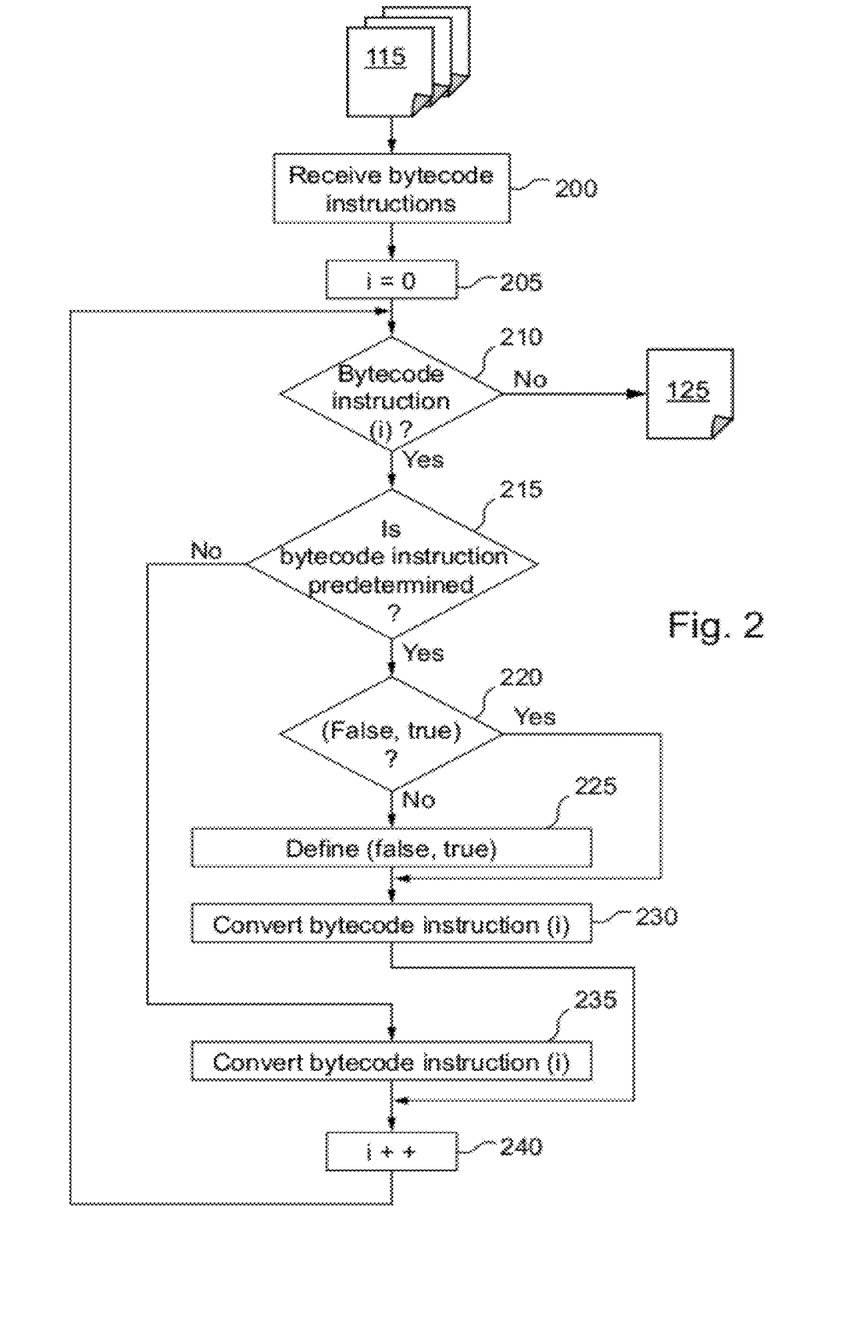
FIG. 2 is a diagrammatic illustration of steps of an example algorithm for converting bytecode instructions resulting from a compilation of source code, in accordance with the invention.

FIG. 2 is a diagrammatic illustration of steps of an example algorithm for converting bytecode instructions resulting from a compilation of source code, in accordance with the invention.

A first step (step 200) here consists in receiving the bytecode instructions to convert. They come, for example from files 115 obtained by compilation of Java source files 105.

In a following step, a bytecode instruction index i is initialized to zero (step 205). A test is then carried out to determine whether a bytecode instruction exists corresponding to the index i (step 210).

If there is a bytecode instruction corresponding to the index i, a second test is carried out to determine whether the bytecode instruction corresponding to the index i is a predetermined instruction which is liable to involve a Boolean value (step 215). Such bytecode instructions are in particular the following, iconst_0 and sconst_0 which are intended to put the value zero (coded in integer and short code form, respectively) on the execution stack;

iconst_1 and sconst_1 which are intended to put the value one (coded in integer and short code form, respectively) on the execution stack; and, ifeq which is intended to verify whether the value present on the execution stack corresponds to a true state or not, that is to say whether that value is equal to one or not.

In the affirmative, a test is carried out to determine whether the Boolean states have been defined (step 220).

If the Boolean states have not been defined, they are defined (step 225). Such a definition may in particular consist of the definition of a constant, that is to say in the assigning of a predetermined value to a constant having a predetermined name (for example, false=35 and true=65). They may also consist in computing values, in particular random values using standard functions (for example, false=random(127) and true=random(127) where random(n) is a function which gives a random number comprised between zero and n).

As stated previously, the Boolean states may be defined by the virtual machines. In this case, steps 220 and 225 are not necessary.

After the Boolean states have been defined, when they have been defined in advance or when they are determined by the virtual machines, the bytecode instruction corresponding to the index i is deleted and a new bytecode instruction is inserted in its place (step 230). This step consists in identifying, for example in a conversion table, a bytecode instruction directed to similar processing to the processing carried out by the bytecode instruction corresponding to the index i and performed on a predetermined Boolean state, that is to say on a value different from zero and one.

By way of illustration, the bytecode instructions iconst_0 and sconst_0 may be deleted and the bytecode instruction sconst_false may be inserted in their places. As stated earlier, the bytecode instruction sconst_false is intended to put the value for the variable false (coded here in short code form) on the execution stack. Similarly, the bytecode instructions iconst_1 and sconst_1 may be deleted and the bytecode instruction sconst_true may be inserted in their places. The bytecode instruction sconst_true is intended to put the value for the variable true (coded here in short code form) on the execution stack. Similarly, the bytecode instruction ifeq may be deleted and the bytecode instruction ifBeq may be inserted in its place, the bytecode instruction ifBeq being intended to verify whether the value present on the execution stack corresponds to a true state or not, that is to say whether that value is equal to the value of the variable true or not.

If the bytecode instruction corresponding to the index i is not a predetermined instruction involving a Boolean value, the bytecode instruction corresponding to the index i is converted in standard manner (step 235), for example using a conversion table.

After the bytecode instruction corresponding to the index i has been converted (step 230 or 235), the index i. is incremented by one (step 240), and the algorithm returns to step 210 where a test is carried out to determine whether there is a bytecode instruction to convert corresponding to the index i.

If there is no bytecode instruction corresponding to the index i (step 210), all the bytecode instructions have been converted. The resulting file, here the file 125 of Cap type, may be used in a device, in particular a microcircuit card, comprising an appropriate virtual machine, that is to say here, a Java Card virtual machine.

As stated earlier, the instruction set of the virtual machines used for the execution of applications implementing the invention is modified. A function of Boolean state comparison type, for example the function ifBeq described earlier, is added. Such a function makes it possible to compare the value present on the execution stack with a predetermined value corresponding to a Boolean state true or false. The Boolean state values may be determined by an executed application or by the virtual machine. Advantageously, a state is assigned by the virtual machine, at the time of its launching, to each Boolean state to avoid errors if those states are not defined by the applications. As described earlier, the value of the Boolean states may be a predetermined constant or a random value determined by the virtual machine at the time of its launching or when an application is executed. These states are defined according to predetermined names (used by the applications), for example true and false. If the value of the Boolean states is a predetermined constant, it is declared in standard manner otherwise it is computed using a standard function.

It is also observed that, according to the embodiment described earlier, the bytecode instructions intended to put the values zero and one on the execution stack are replaced by bytecode instructions intended to put predetermined values (corresponding to the Boolean states) on the execution stack. Such a reattribution may pose problems on executing applications since such a reattribution concerns Boolean type values and values of other types, for example of integer type, in the same way. Thus, for example, a counter may be initialized to the value zero then incremented progressively as computations are carried out so as to stop them according to the value of the counter. The variable associated with such a counter must not be considered as Boolean type.

Several solutions may be implemented to avoid such a problem.

According to a first solution, the virtual machine executing the bytecode instructions is modified to detect unjustified reattributions. For these purposes, tests are carried out (by the virtual machine executing the application) to detect the arithmetical operations to be performed by the virtual machine in accordance with the bytecode instructions executed. If an operand of those arithmetical operations is a variable initialized beforehand to a predetermined value corresponding to a Boolean state, a test is carried out to compare the value of that operand to the values of the Boolean states. If the value of that operand is equal to the value of a Boolean state, it is reinitialized to take the value zero or one corresponding to the value of the Boolean state (zero if the value of the Boolean state is 35 and one if the value of Boolean state is 65 according to the preceding example). If, on the contrary, the value of that operand is not equal to the value of the Boolean state, it is not modified. Thus, all the variables that are to be initialized to zero or one (in accordance with the bytecode instructions resulting from the source code compilation) are, in accordance with the converted bytecode instructions, initialized to the predetermined values corresponding to the Boolean states, their value then being reinitialized to zero or one by the virtual machine if they are variables used for arithmetical operations.

According to a second solution, an analysis of the bytecode instructions resulting from the source code compilation is performed at the time of their conversion. Thus, for each variable to be initialized to zero or one, an analysis of the instructions is carried out to determine whether the variable is, subsequently, used in at least one arithmetical operation, for example an incrementation, or in a logical operation, for example a comparison with a determined value equal to zero or one. If the variable is used in an arithmetical operation, the bytecode instructions linked to its initialization are not modified. In the opposite case, if the variable is used in an arithmetical operation, the bytecode instructions linked to its initialization are converted to initialize the variable to a predetermined value corresponding to a Boolean state.

Figure 3:
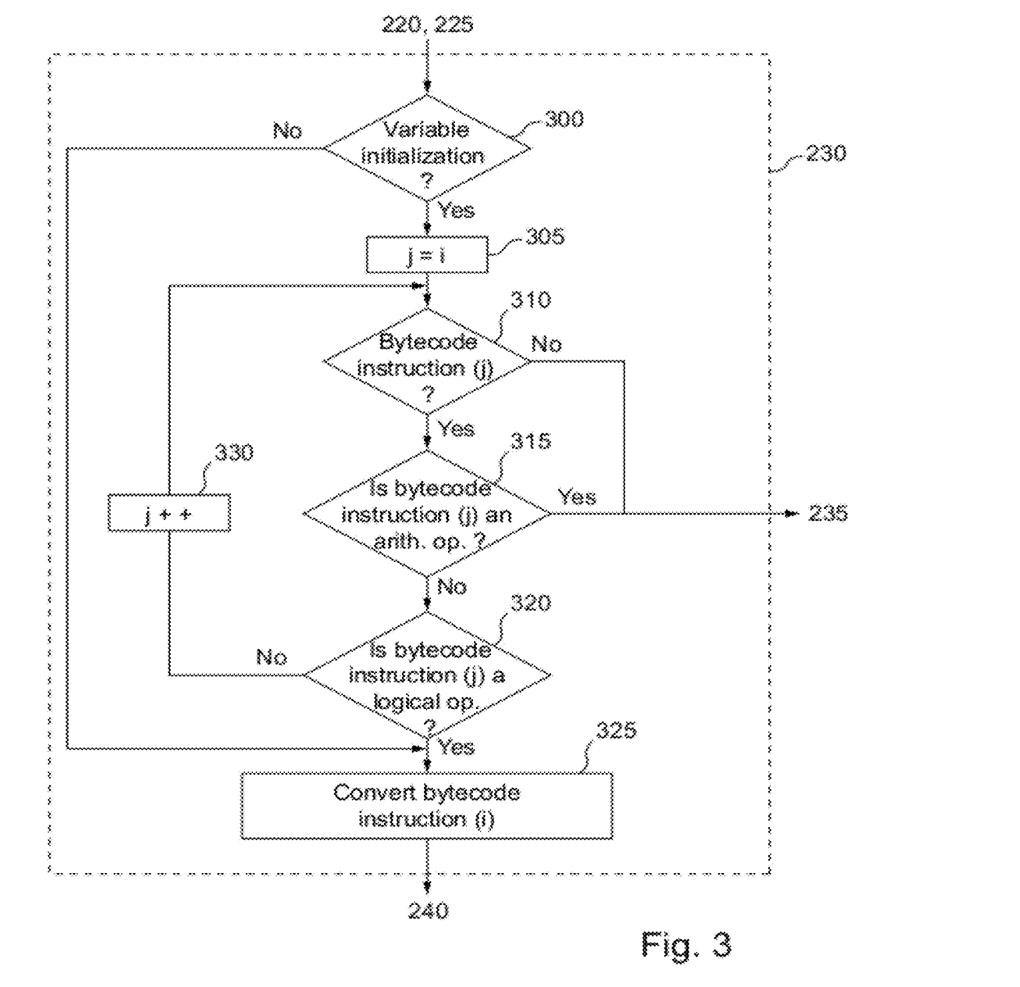
FIG. 3 illustrates an example of a step of analyzing bytecode instructions resulting from a compilation of source code to determine a conversion to perform in accordance with the invention; and, FIG. 4 illustrates an example of hardware architecture adapted to implement certain steps of the invention.

FIG. 3 illustrates an example of such a step of analyzing bytecode instructions resulting from a compilation of source code to determine a conversion to perform in accordance with the invention.

The steps described with reference to FIG. 3 are, for example, carried out during step 230 described with reference to FIG. 2.

A first step is intended here to determine whether or not the bytecode instruction corresponding to the index i is an instruction concerning an initialization or a an attribution of a variable (step 300), that is to say, for example, a bytecode instruction iconst_x followed by a bytecode instruction istore_y to store the value x in the variable y. This step is executed after the step 220 or step 225 described with reference to FIG. 2.

In the affirmative, a variable j, representing an index to bytecode instructions to convert, is initialized to the value of the variable i (step 305).

A test is then carried out to determine whether a bytecode instruction exists corresponding to the index j (step 310). If a bytecode instruction does exist corresponding to the index j, a test is carried out to determine whether the bytecode instruction corresponding to the index j concerns an arithmetical operation and whether an operand of that operation consists of the variable initialized or attributed by the bytecode instruction corresponding to the index i (step 315).

In the negative, a test is carried out to determine whether the bytecode instruction corresponding to the index j concerns a logical operation and whether an operand of that operation consists of the variable initialized or attributed by the bytecode instruction corresponding to the index i (step 320).

In the affirmative, the bytecode instruction corresponding to the index j is converted in accordance with the invention as stated earlier (step 325). This step is followed by the step 240 described with reference to FIG. 2.

If the bytecode instruction corresponding to the index j does not concern a logical operation (step 320), the index j is incremented by one (step 330) and step 310 is again executed to process the following bytecode instruction if there is one.

If the bytecode instruction corresponding to the index j concerns an arithmetical operation and if an operand of that operation consists of the variable initialized to attributed by the bytecode instruction corresponding to the index i (step 315) or if there is no bytecode instruction corresponding to the index j, the bytecode instruction corresponding to the index i is converted in standard manner (step 235 described with reference to FIG. 2).

Thus, the steps described with reference to FIG. 3 make it possible to distinguish the variables used for logical operations from the variables used for arithmetical operations and to accordingly adapt the conversion of the bytecode instructions to improve the security of execution of applications without disturbing their operation.

Similarly, the invention as described earlier may be implemented to provide security for the execution of an application according to the method described in patent application WO 2005/008451. In accordance with the teaching of that patent application, a predetermined value is placed on the execution stack. Next, after the execution of an instruction set whose execution must be checked, the value present on the execution stack is compared with the predetermined value placed thereon beforehand. This comparison makes it possible to detect an execution anomaly of that instruction set.

The predetermined values used to check the execution of instruction sets are advantageously modified in accordance with the invention.

According to another embodiment, which may be implemented independently or in combination with that described earlier, the set of bytecode instructions of the code in intermediate programming language is modified at the time of its conversion so as to incorporate one or more bytecode instructions enabling the execution of functions to be checked, independently of the bytecode instructions of the initial set.

It is to be recalled here that, in accordance with the Java Card specification, bytecode instructions may be added to those of Cap type files, intended for the virtual machine interpreting the bytecode instructions of those files. These bytecode instructions are processed by the virtual machine as commands and not as instructions of the executed application. They are identified using predetermined tags and form entities called custom components.

Data fields (called info items) of custom components may thus be used to send bytecode instructions to a virtual machine intended to check the execution of functions or sets of functions.

Thus, in accordance with this second embodiment, bytecode instructions are added to the bytecode instructions of the Cap type files to check the execution of functions, for example functions defined by a system of brackets as described in the patent application WO 2005/008451. These bytecode instructions may in particular be intended to verify that the execution stack is in an expected state after the execution of functions.

By way of illustration, such bytecode instructions may be introduced into a Cap type file, in the form of data in info items of custom components, in order to check the execution of all the functions defined by a brackets system in the file considered. They may command the virtual machine to verify that the execution stack is empty after the execution of each function. For these purposes, the virtual machine may verify that the address of the top of the execution stack is equal to the address of the bottom of the execution stack.

It is noted here that such an embodiment enables the execution of bytecode instructions of Cap type files by standard virtual machines, the bytecode instructions inserted in the form of data in custom component info items of then being ignored.

Figure 4:
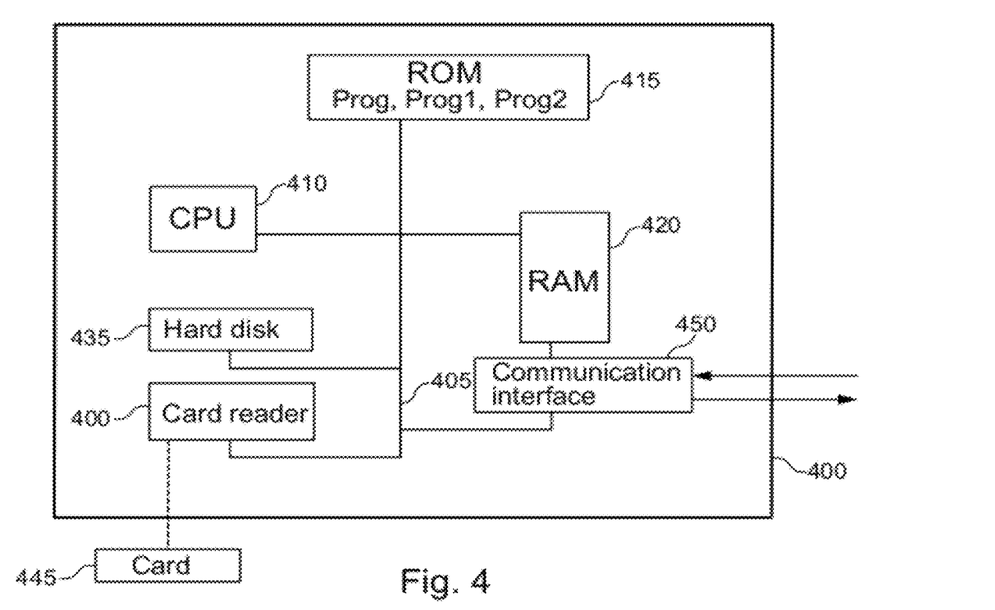

FIG. 4 illustrates an example of hardware architecture of a device 400 adapted to implement certain steps of the invention, in particular the steps described with reference to FIGS. 2 and 3. The device 400 is, for example, a calculator or a computer. It comprises a communication bus 405 here to which are connected:

- one or more central processing units or microprocessors 410 (CPU);
- a read only memory 415 (ROM) able to contain programs (prog, prog1 and prog2) necessary for the implementation of the invention;
- a random access memory (RAM) or cache memory 420, comprising registers adapted to record variables and parameters created and modified during the execution of the aforementioned programs; and
- a communication interface 450 adapted to transmit and to receive data.

The device 400 also has, preferably, a hard disk 435 able to contain the aforesaid programs as well as information processed or to process according to the invention and a memory card reader 440 adapted to receive a memory card 445 and to read or write therein data processed or to process according to the invention.

The communication bus allows communication and interoperability between the different elements included in the device 400 or connected to it. The representation of the bus is non-limiting and, in particular, the central processing unit may communicate instructions to any element of the device 400 directly or by means of another element of the device 400.

The executable code of each program enabling the programmable device to implement the methods according to the invention may be stored, for example, on the hard disk 435 or in read only memory 415.

According to a variant, the memory card 445 can contain information, in particular information to process according to the invention, as well as the executable code of the aforementioned programs which, once read by the device 400, is stored on the hard disk 435.

According to another variant, the executable code of the programs and the information to process according to the invention may be received, at least partially, via the interface 450, in order to be stored in identical manner to that described previously.

More generally, the program or programs as well as the information to process according to the invention may be loaded into one of the storage means of the device 400 before being executed.

The central processing unit 410 will control and direct the execution of the instructions or portions of software code of the program or programs according to the invention, these instructions being stored on the hard disk 435 or in the read-only memory 415 or in the other aforementioned storage elements. On powering up, the program or programs which are stored in a non-volatile memory, for example the hard disk 435 or the read only memory 415, are transferred into the random-access memory 420, which then contains the executable code of the program or programs according to the invention, as well as registers for storing the variables and parameters necessary for implementation of the invention.

Naturally, to satisfy specific needs, a person skilled in the art will be able to make amendments to the preceding description. In particular, whereas the invention is, in the interest of clarity and illustration, particularly described with reference to the Java programming language, it may be implemented with other types of programming language.

APPENDIX

TABLE 1

| Java source file | Java Class file | Index | Comments |
|---|---|---|---|
| public void deselect( ){ boolean myBoolean=false | iconst_0 | 0 | Put the value equal to zero on the execution stack |
|  | istore_1 | 1 | Store the value of the execution stack in a first local variable |
| boolean myResult=true | iconst_1 | 2 | Put the value equal to one on the execution stack |
|  | istore_2 | 3 | Store the value of the execution stack in a second local variable |
| if(myBoolean==true){ | iload_1 | 4 | Put the value of the first local variable on the execution stack |
|  | ifeq 9 | 5 | If the value of the execution stack is not equal to one, go to 9 |
| myResult=true | iconst_1 | 6 | Put the value equal to one on the execution stack |
|  | istore_2 | 7 | Store the value of the execution stack in the second local variable |
| } else { | goto 11 | 8 | Go to 11 |
| myResult=true} else{ | iconst_0 | 9 | Put the value equal to zero on the execution stack |
| myResult=false} | istore_2 | 10 | Store the value of the execution stack in a second local variable |
| } | return | 11 |  |

TABLE 2

| Java Class file | Java Cap file | Index | Comments |
|---|---|---|---|
| iconst_0 | sconst_false | 0 | Put the first predetermined value (equal, for example, to 35) on the execution stack |
| istore_1 | sstore_1 | 1 | Store the value of the execution stack in a first local variable |
| iconst_1 | sconst_true | 2 | Put the second predetermined value (equal, for example, to 65) on the execution stack |
| istore_2 | sstore_2 | 3 | Store the value of the execution stack in a second local variable |
| iload_1 | sload_1 | 4 | Put the value of the first local variable on the execution stack |
| ifeq 9 | ifBeg 9 | 5 | If the value of the execution stack is not equal to the second predetermined value, go to 9 |
| iconst_1 | sconst_true | 6 | Put the second predetermined value on the execution stack |
| istore_2 | sstore_2 | 7 | Store the value of the execution stack in the second local variable |
| goto 11 | goto 11 | 8 | Go to 11 |
| iconst_0 | sconst_false | 9 | Put the first predetermined value on the execution stack |
| istore_2 | sstore_2 | 10 | Store the value of the execution stack in a second local variable |
| return | return | 11 | |

TABLE 3

| Compiled bytecode instructions | Converted bytecode instructions |
|---|---|
| iconst_0 | sconst_false |
| iconst_1 | sconst_true |
| istore_1 | sstore_1 |
| istore_2 | sstore_2 |
| iload_1 | sload_1 |
| iload_2 | sload_2 |
| ifeq | ifBeq |
| goto | goto |
| return | return |

The invention claimed is:

1. A computer method for providing security for intermediate programming code for execution by a virtual machine, the method comprising:
   receiving (200) a plurality of bytecode instructions of said intermediate programming code;
   converting (230, 235) said plurality of bytecode instructions, said conversion comprising a step of inserting at least one bytecode instruction relative to a function for execution checking of at least one bytecode instruction of said plurality of bytecode instructions; and
   generating bytecode, the generated bytecode comprising said plurality of converted bytecode instructions.

2. The method according to claim 1, wherein said inserting step comprises a step of inserting a bytecode instruction representing a command for said virtual machine.

3. The method according to claim 2, wherein said command for said virtual machine is directed to the verification of an execution stack of said virtual machine in order to check that said execution stack of said virtual machine is empty.

4. The method according to claim 1, wherein said converting step comprises, for each of said received bytecode instructions, the following steps:

if said bytecode instruction is directed to predetermined processing of at least one first predetermined value, deleting said bytecode instruction and inserting (230) a bytecode instruction concerning said predetermined processing for at least one second predetermined value, distinct from said at least one first predetermined value; and if said bytecode instruction is directed to the comparison of said at least one first value with another value, deleting said bytecode instruction and inserting (230) a bytecode instruction directed to comparing said at least one second value with said other value.

5. The method according to claim 4, wherein said bytecode instruction directed to predetermined processing of at least one first predetermined value is directed to the initialization or attribution of a local variable whose value is, after execution of the initializing or attributing step, equal to said first value.

6. The method according to claim 5, further comprising:
   a step of defining (225) or computing said at least one second value.

7. The method according to claim 5, further comprising:
   analyzing (315, 320) at least one set of said plurality of bytecode instructions, said steps of deleting said bytecode instruction, directed to predetermined processing of at least one first predetermined value; and
   inserting said bytecode instruction directed to said predetermined processing for at least one second predetermined value, being attributed in response to said analyzing step.

8. The method according to claim 4, further comprising:
   defining (225) or computing said at least one second value.

9. The method according to claim 8, further comprising:
   analyzing (315, 320) at least one set of said plurality of bytecode instructions, said steps of deleting said bytecode instruction, directed to predetermined processing of at least one first predetermined value; and
   inserting said bytecode instruction directed to said predetermined processing for at least one second predetermined value, being attributed in response to said analyzing step.

10. The method according to claim 4, further comprising:
    analyzing (315, 320) at least one set of said plurality of bytecode instructions, said steps of deleting said bytecode instruction, directed to predetermined processing of at least one first predetermined value; and
    inserting said bytecode instruction directed to said predetermined processing for at least one second predetermined value, being attributed in response to said analyzing step.

11. The method according to claim 1 claims, the method further comprising a prior step of code compiling (110), the result of said compiling step comprising said plurality of bytecode instructions.

12. A non-transitory computer-readable medium having stored thereon computer-readable code in the form of a computer program comprising instructions sufficient for causing a CPU of a computer device to carry out each of the steps of the method according to claim 1 when said program is executed on the computer device.

13. A device comprising means adapted for implementation of each of the steps of the method according to claim 1.

* * * * *